United States Patent
Hoy et al.

(10) Patent No.: US 11,794,254 B1
(45) Date of Patent: Oct. 24, 2023

(54) EFFICIENT BULK UNFUSED POWDER REMOVAL SYSTEM AND METHOD

(71) Applicant: 3D Systems, Inc., Rock Hill, SC (US)

(72) Inventors: Ahren Michael Hoy, Charlotte, NC (US); Turner Ashby Cathey, Rock Hill, SC (US); Alexander J Geyling, Fort Mill, SC (US)

(73) Assignee: 3D SYSTEMS, INC., Rock Hill, SC (US)

( * ) Notice: Subject to any disclaimer, the term of this patent is extended or adjusted under 35 U.S.C. 154(b) by 0 days.

(21) Appl. No.: 18/163,956

(22) Filed: Feb. 3, 2023

Related U.S. Application Data

(62) Division of application No. 17/402,811, filed on Aug. 16, 2021, now Pat. No. 11,597,016.

(60) Provisional application No. 63/065,859, filed on Aug. 14, 2020.

(51) Int. Cl.
| | |
|---|---|
| *B22F 10/68* | (2021.01) |
| *B33Y 10/00* | (2015.01) |
| *B33Y 30/00* | (2015.01) |
| *B33Y 40/20* | (2020.01) |
| *B22F 10/28* | (2021.01) |

(52) U.S. Cl.
CPC .............. *B22F 10/68* (2021.01); *B22F 10/28* (2021.01); *B33Y 10/00* (2014.12); *B33Y 30/00* (2014.12); *B33Y 40/20* (2020.01)

(58) Field of Classification Search
CPC .......... B22F 10/68; B22F 10/28; B33Y 10/00; B33Y 30/00; B33Y 40/20
See application file for complete search history.

(56) References Cited

U.S. PATENT DOCUMENTS

| | | |
|---|---|---|
| 2006/0090603 A1 | 5/2006 | Lewis |
| 2015/0197396 A1* | 7/2015 | Simons .................. B05C 19/06 |
| | | 118/255 |
| 2016/0053346 A1 | 2/2016 | Szuromi et al. |
| (Continued) | | |

FOREIGN PATENT DOCUMENTS

EP    3167980 A1    5/2017

OTHER PUBLICATIONS

PCT International Search Report for International Search Authority for PCT/US2021/046081 dated Feb. 7, 2022 (5 pages).

(Continued)

*Primary Examiner* — David H Banh

(57) ABSTRACT

An additive manufacturing system for producing a three-dimensional article includes a print engine, a post-fabrication powder removal apparatus, a transport mechanism, and a controller. The post fabrication removal apparatus includes a rotary frame defining an internal receptacle cavity, a plurality of clamps coupled to a corresponding plurality of actuators, a clamping plate coupled to a lift apparatus, and an agitation device mounted to the clamping plate. The controller is configured to perform the following steps: (1) Operate the transport mechanism to transport the build box to the internal receptacle cavity. (2) Operate the plurality of actuators to engage the build box with the plurality of clamps to secure the build box to the rotary frame. (3) Operate the rotary frame to rotate the build box until unfused powder begins to exit the build box. (4) Operate the agitation device to facilitate pouring of the unfused powder from the build box.

20 Claims, 11 Drawing Sheets

(56) References Cited

U.S. PATENT DOCUMENTS

2016/0279871 A1    9/2016  Heugel et al.
2016/0311164 A1*  10/2016  Miyano .................. B33Y 30/00
2018/0215097 A1    8/2018  Pourcher et al.
2020/0254523 A1    8/2020  Beauchamp et al.

OTHER PUBLICATIONS

PCT International Written Opinion for International Search Authority for PCT/US2021/046081 dated Feb. 7, 2022 (6 pages).

* cited by examiner

US 11,794,254 B1

EFFICIENT BULK UNFUSED POWDER REMOVAL SYSTEM AND METHOD

CROSS REFERENCE TO RELATED APPLICATIONS

This application is a divisional of U.S. application Ser. No. 17/402,811 which was filed on Aug. 16, 2021, which claims priority to U.S. Provisional Application Ser. No. 63/065,869, Entitled "EFFICIENT BULK UNFUSED POWDER REMOVAL SYSTEM AND METHOD" by Ahren Hoy, et al., filed on Aug. 14, 2020, incorporated herein by reference under the benefit of U.S.C. 119(e).

STATEMENT OF GOVERNMENT RIGHTS

This invention was made with government support under Agreement No. W911NF-18-9-000.3 awarded by the U.S. Army Research Laboratory and AMMP Consortium Member Agreement Number 201935 awarded by the National Center for Manufacturing Sciences (NCMS). The government has certain rights in the invention.

FIELD OF THE INVENTION

This non-provisional patent application claims priority to U.S. Provisional Application Ser. No. 63/065,859, Entitled "EFFICIENT BULK UNFUSED POWDER REMOVAL SYSTEM AND METHOD" by Ahren Hoy et al., filed on Aug. 14, 2020, incorporated herein by reference under the benefit of U.S.C. 119(e).

FIELD OF THE INVENTION

The present disclosure concerns an apparatus and method for a layer-by-layer manufacture of three dimensional (3D) articles by selectively fusing or binding powder materials. More particularly, the present disclosure concerns a de-powdering system for efficiently removing unfused or unbound powder from build boxes that are generally too large and heavy for manual handling and lifting when filled with material.

BACKGROUND

Three dimensional (3D) printing systems are in rapidly increasing use for purposes such as prototyping and manufacturing high value and/or customized articles. One type of three dimensional printer utilizes a layer-by-layer process to form a three dimensional article of manufacture from powdered materials. Each layer of powdered material is selectively fused using an energy beam such as a laser, electron, or particle beam or combined with a binder matrix. There is a desire to have large capacity systems that can fabricate physically large articles. One challenge with such systems is an efficient and safe method for a removal of unfused or unbound powder after fabrication is complete.

SUMMARY

Figure 1:
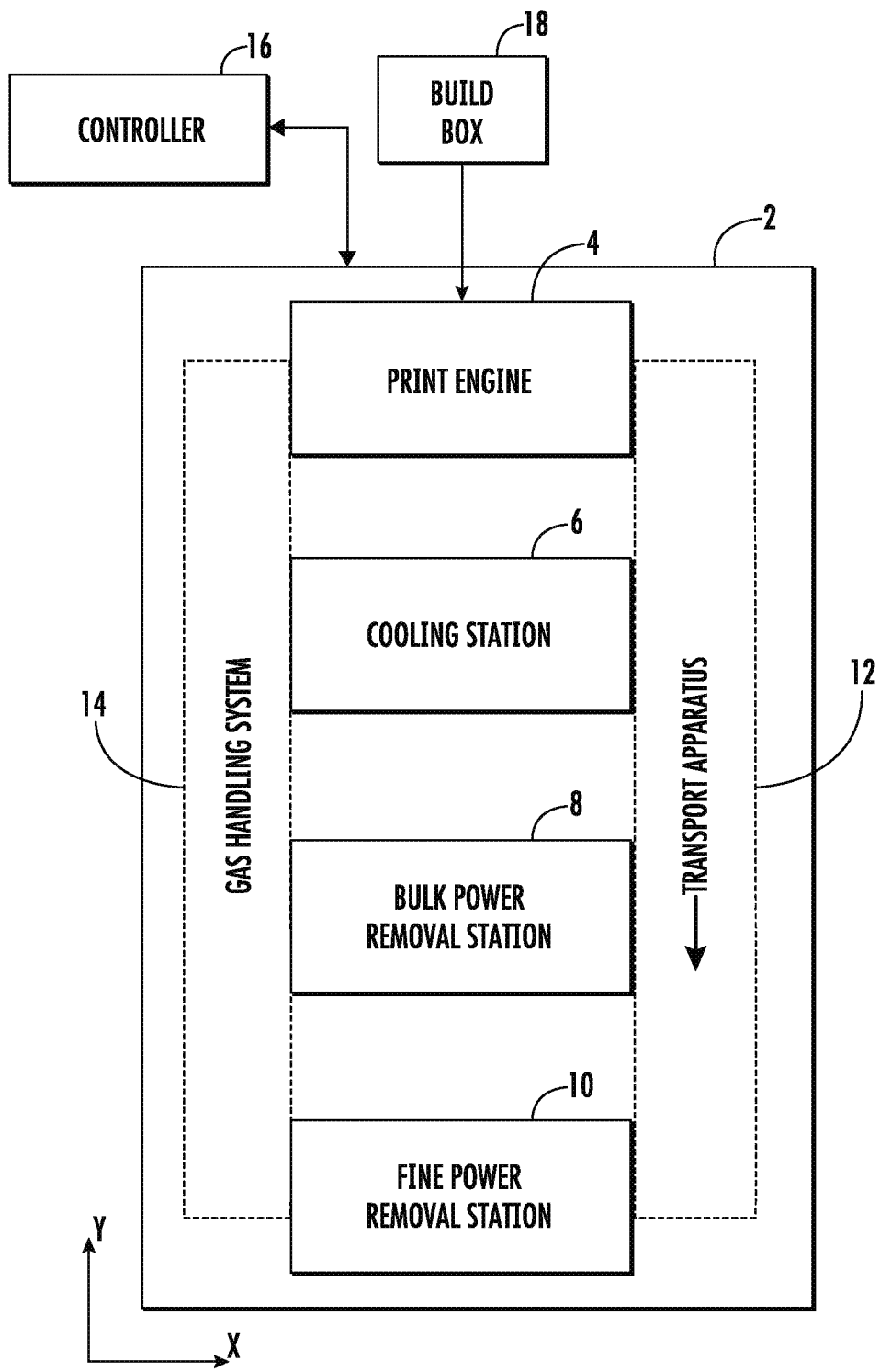
FIG. 1 is a schematic block diagram of an embodiment of an additive manufacturing system for producing a three-dimensional (3D) article.

In a first aspect of the disclosure, an additive manufacturing system for producing a three-dimensional (3D) article includes at least a print engine, a post-fabrication powder removal apparatus, a transport mechanism, and a controller. The post fabrication removal apparatus includes a rotary frame defining an internal receptacle cavity, a plurality of clamps coupled to a corresponding plurality of actuators, a clamping plate coupled to a lift apparatus, and an agitation device mounted to the clamping plate. The controller is configured to perform the following steps: (1) Operate the transport mechanism to transport the build box to the internal receptacle cavity. (2) Operate the plurality of actuators to engage the build box with the plurality of clamps to secure the build box to the rotary frame. (3) Operate the rotary frame to rotate the build box until unfused powder begins to exit the build box. (4) Operate the agitation device to facilitate pouring of the unfused powder from the build box.

The disclosed system enables efficient and fully automated bulk removal of unfused powder from the 3D article. Operation of the clamps assures a very smooth rotation of the build box. Proper clamping is particularly important for a large metal powder build box due to an enormous weight of the 3D article and unfused powder. Having the agitation device mounted directly to the clamping plate maximizes a percentage of agitation energy that is transferred through the build plate to facilitate removal of powder with the least agitation energy.

In one implementation, the print engine is configured to melt and fuse layers of the powder material using an energy beam. The energy beam can be a laser, an electron beam, or a particle beam.

In another implementation, the transport mechanism transports the build box from the print engine to a cooling station. Step (1) includes transporting the build box from the cooling station to the internal receptacle cavity of the rotary frame.

In yet another implementation, the plurality of clamps includes an upper clamp and at least one lateral clamp for clamping the build box along vertical and lateral axes during step (2). The lateral clamps can include lateral clamps that engage from opposing lateral directions. Providing clamping along multiple axes is advantageous when supporting and rotating a very heavy build box.

In a further implementation, before step (4), the lift apparatus moves the clamp plate into clamping engagement with the build plate and then moves again to extract the build plate from the powder bin. This provides a vibration isolation between the build plate and the powder bin during operation of the agitation device. Wire ropes can provide vibration isolation between the build plate and the rotary frame. The vibration isolation reduces a requirement for a vibratory power level. The vibration isolation and reduced vibratory power level reduce NVH (noise, vibration, and harshness) which is advantageous for various reasons. This reduces vibratory damage to structural components of the manufacturing system including the build box, the rotary frame, and other components of the powder removal apparatus. This also reduces vibratory energy transfer to other components of the manufacturing system such as to the print engine. The powder deposition and beam system are both sensitive to vibrations.

In a yet further implementation, during steps 1) and (2) the rotary frame is in a rotative home position of zero degrees at which an open top of the build box faces upward. During step (3) the rotary frame is rotated about 180 degrees from the home position about a central axis.

In another implementation, the rotary frame rotates back and forth along a central axis to further facilitate unfused powder removal during step (4).

DETAILED DESCRIPTION OF THE PREFERRED EMBODIMENTS

Figure 8A:
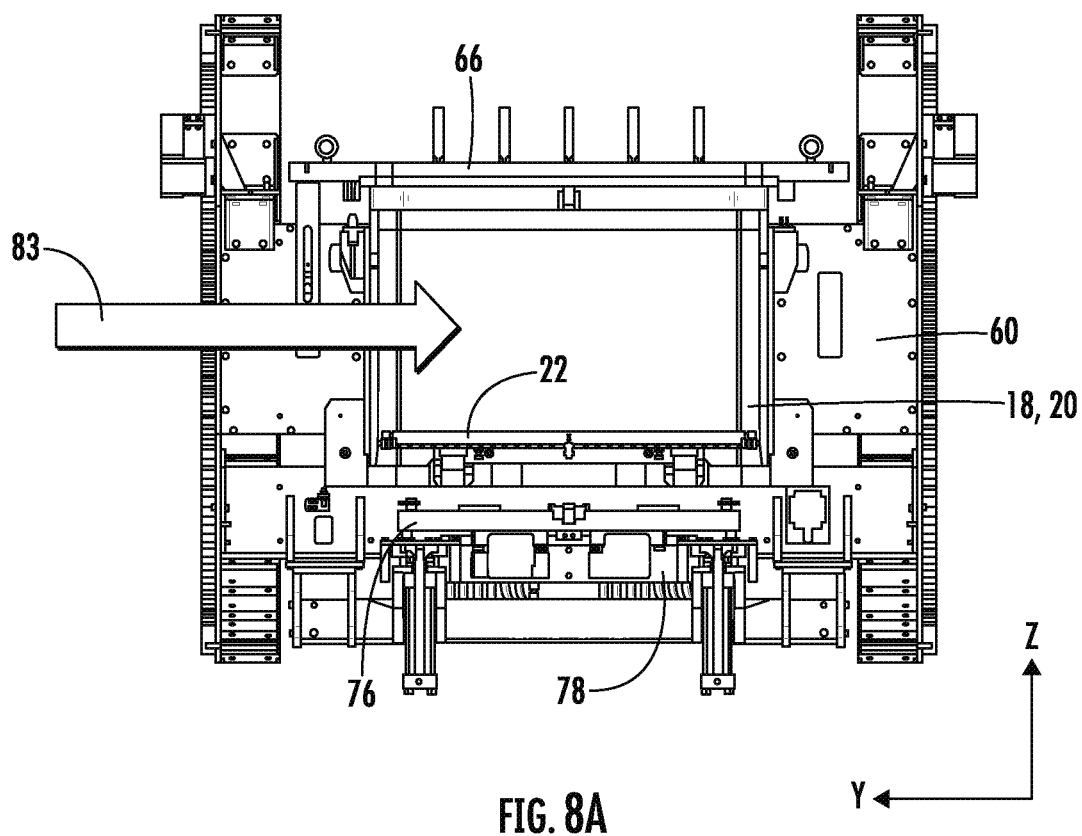
FIG. 8A is a side cutaway view of a rotary frame with a vertical cut parallel to a YZ-plane. The rotary frame defines an internal receptacle cavity within which a build box has been loaded. In an illustrated embodiment, the build box has been loaded in a direction parallel to a lateral Y-axis.
Figure 8B:
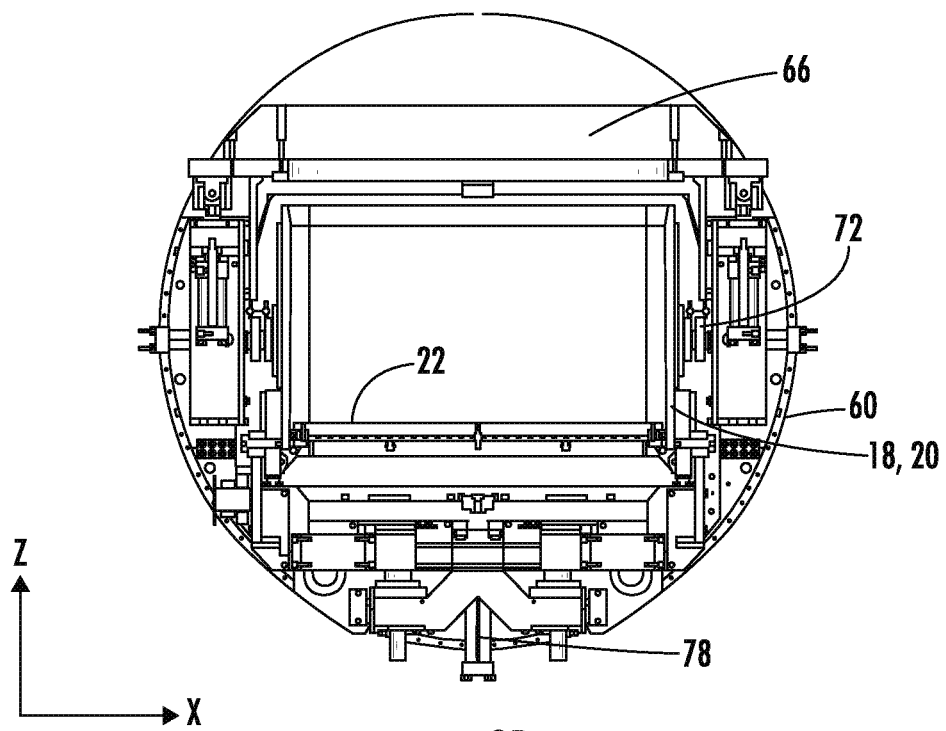
FIG. 8B is a side cutaway view of a rotary frame with a vertical cut parallel to a XZ-plane. The rotary frame is in a "rotative home" or zero degree position in which an open top of the build box faces upwardly in the +Z direction. The rotative frame is configured to rotate on a central axis that is parallel to a lateral Y-axis.
Figure 8C:
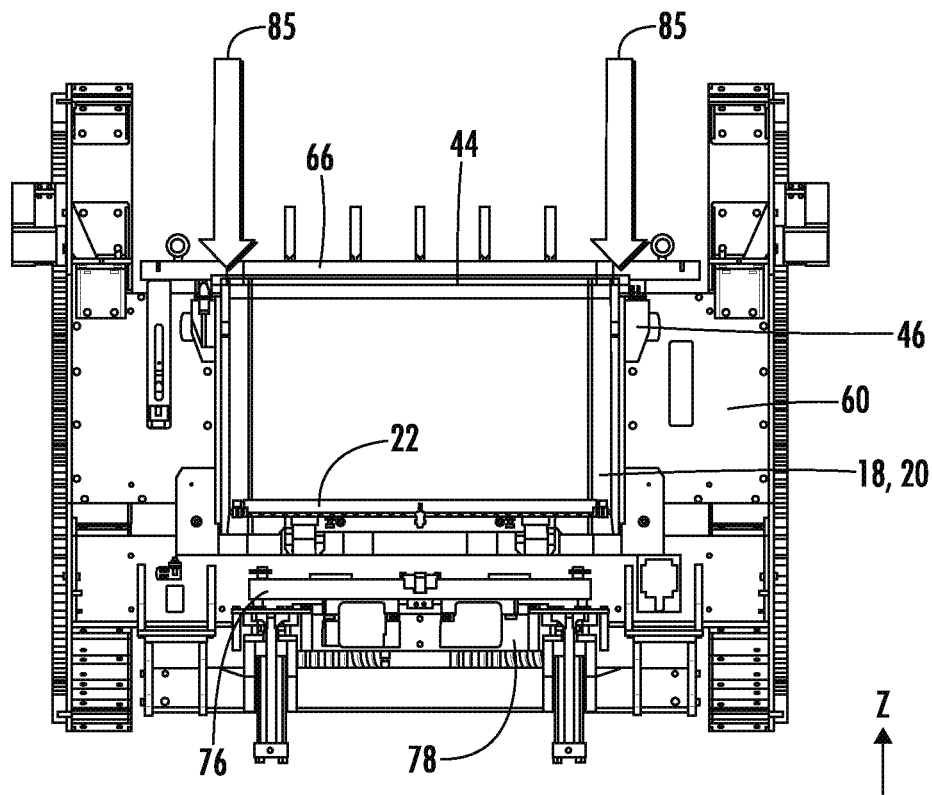
FIG. 8C is a side cutaway view of a rotary frame with a vertical cut parallel to a vertical YZ-plane. Compared to FIG. 8A, an upper clamp has been lowered and in vertical clamping engagement with a top of the build box. The upper clamp lowers along the Z-axis and provides clamping along the Z axis.
Figure 8D:
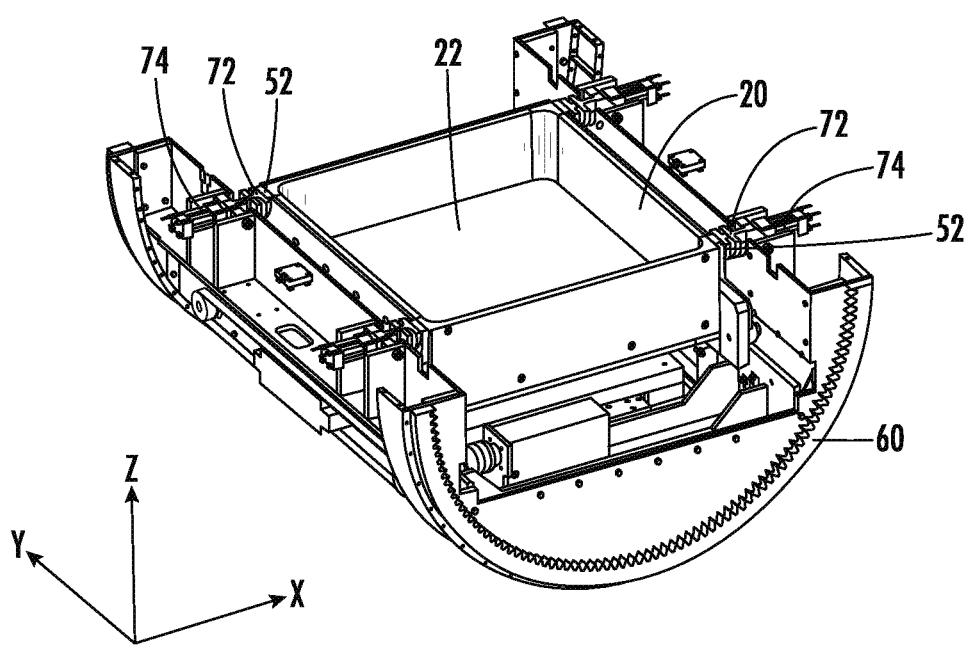
FIG. 8D is an isometric cutaway view with a horizontal cut parallel to a lateral XY-plane. The rotary frame is in a rotative home position. Lateral clamps have been extended inwardly and in lateral clamping engagement with the build box. The lateral clamps move along the lateral X-axis and provide clamping along the lateral X-axis.
Figure 8E:
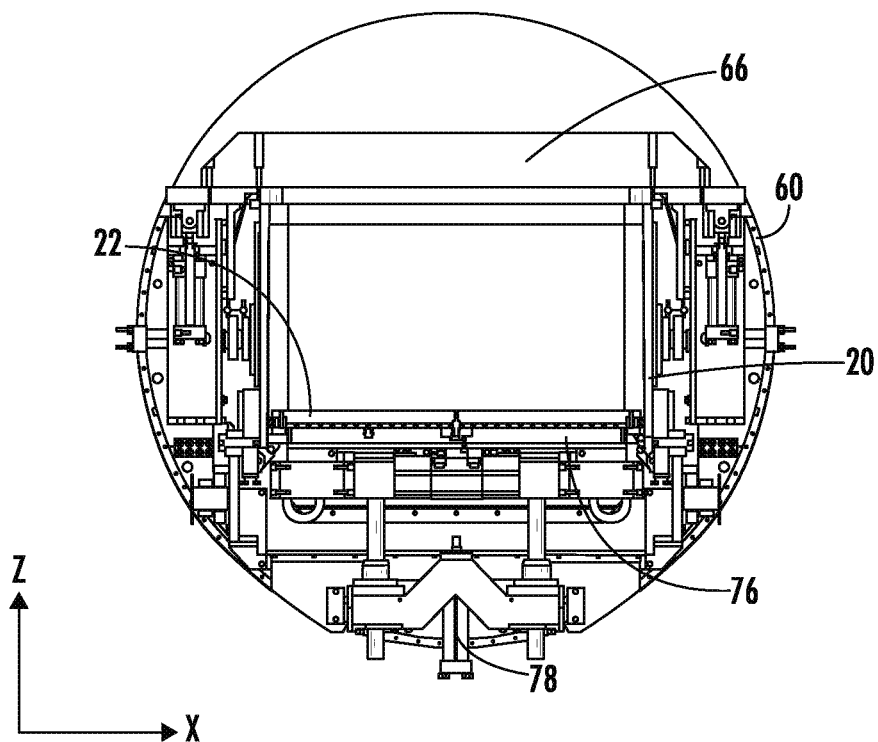
FIG. 8E is a side cutaway view of a rotary frame with a vertical cut parallel to a XZ-plane. The rotary frame is in a rotative home position. Compared to FIG. 8B the build box has been vertically and laterally clamped and the clamping plate has been clamped to the build plate. The clamping plate is moved along the Z-axis to engagement with the build plate by a lift apparatus.
Figure 8F:
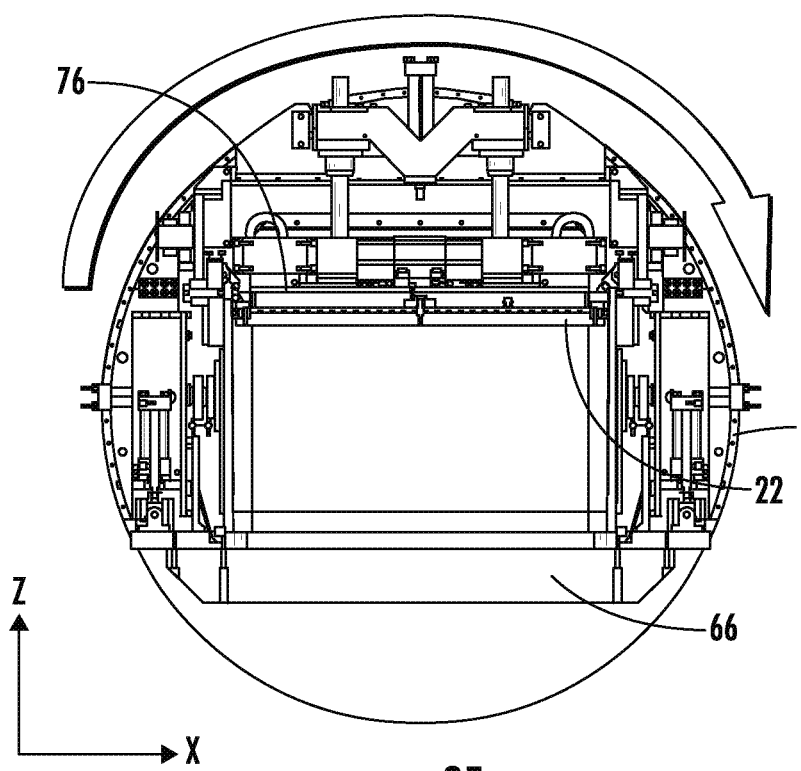
FIG. 8F is a side cutaway view of a rotary frame with a vertical cut parallel to a XZ-plane. Compared to FIG. 8E, the rotary frame is rotated 180 degrees from the home position about a central axis parallel to the Y-axis. The central axis is defined as the axis of rotation of the rotary frame, and is generally at a center of the rotary frame relative to the XZ-plane.
Figure 8G:
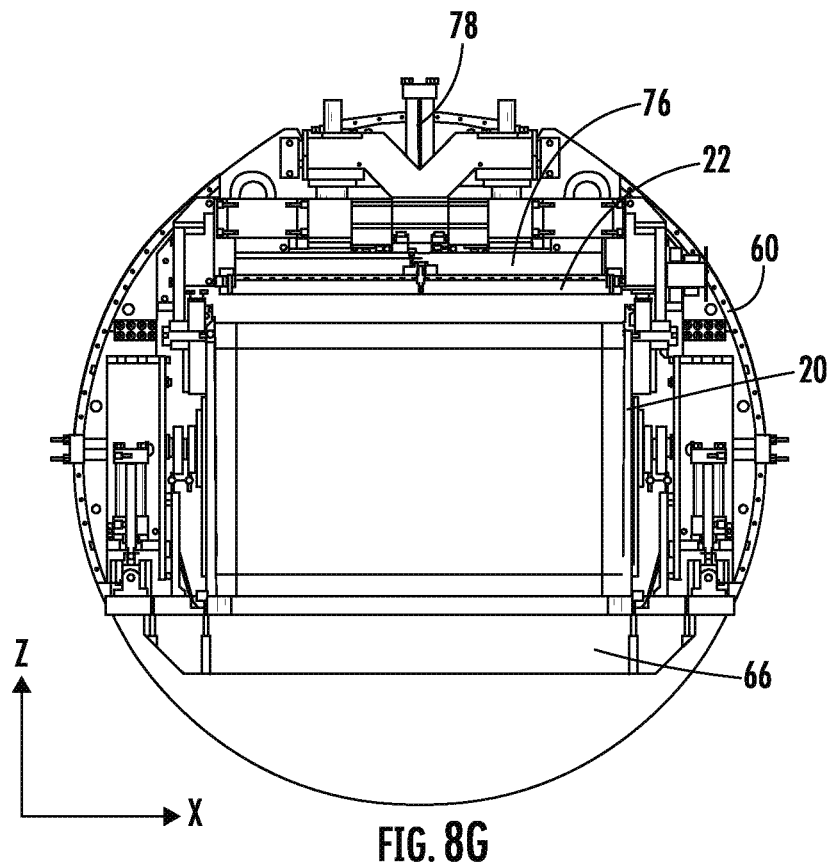
FIG. 8G is a side cutaway view of a rotary frame with a vertical cut parallel to a XZ-plane. Compared to FIG. 8F, the clamping plate has extracted the build plate from the powder bin in an upward (+Z) direction. The lift apparatus has operated to lift the clamping plate along the Z-axis to extract the build plate.
Figure 8H:
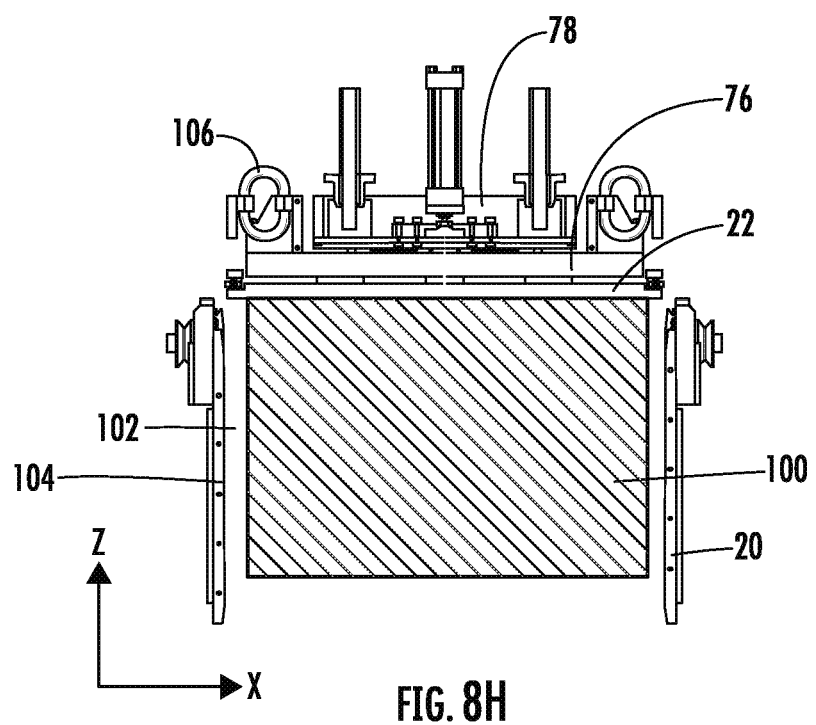
FIG. 8H is a side schematic cutaway view illustrating a powder bin, a build plate, a build plate clamp, and a 3D article attached to the build plate. The orientation is 180 degrees from the home position so that an open side of the build box faces downward. The clamping plate is supporting the build plate in an extracted position relative to the powder bin.

FIG. 1 is a schematic block diagram of an embodiment of an additive manufacturing (AM) system 2 for producing a three-dimensional (3D) article 100 (FIG. 8H). System 2 includes a plurality of components at least including a print engine 4, a cooling station 6, a bulk powder removal apparatus or station 8, a fine powder removal apparatus or station 10, a transport apparatus 12, a gas handling system 14, and a controller 16. The various components 4-14 can individually have separate "lower level" controllers for controlling their internal functions. In some embodiments, a controller can function as a central controller. In the following description, controller 16 will be considered to include all controllers that may reside externally or within the components 4-14. Controller 16 can be internal to AM system 2, external to AM system 2, or include portions that are both internal and external to AM system 2.

The transport apparatus 12 is for transporting a build box 18 through the various components 4-10 in a sequence that includes fabricating, cooling, and de-powdering a 3D article being manufactured. The gas handling system 14 is for controlling an environment for components 4-10. In one embodiment, the gas handling system is configured to evacuate components 4-10 and then to backfill them with a non-oxidizing gas such as argon or nitrogen in order to maintain the build box 18 within a non-oxidizing environment.

Controller 16 includes a processor coupled to a non-transient or non-volatile information storage device which stores software instructions. When executed by the processor, the software instructions operate any or all portions of the system 2. In an illustrative embodiment, fabrication, cooling, de-powdering, and other functions can be performed in a fully automated way by controller 16.

Controller 16 is configured to perform steps such as (1) operate gas handling system 14 to evacuate and backfill components 4-10, (2) operate print engine 4 to fabricate a 3D article 100 in build box 18, (3) operate transport apparatus 12 to transport build box 18 (which now contains the 3D article and unfused powder) to the cooling station 6, (4) after an appropriate cooling time, operate transport apparatus to transport build box 18 to build powder removal station 8, (5) operate bulk powder removal apparatus 8 to remove most of the unfused powder from the build box 18, and (6)

operate transport apparatus 12 to transport the build box 18 to the fine powder removal station 10. At the fine powder removal station 10, residual unfused powder is removed either automatically or manually. All the while, controller 16 operates the gas handling system 14 to maintain the non-oxidizing gaseous environment within the components 4-10 as required.

AM system 2 can have other components such as an inspection station or a station for facilitating unloading of the 3D article 100 from the build box 18. The additional components can be manually operated or under control of controller 16.

Figure 2:
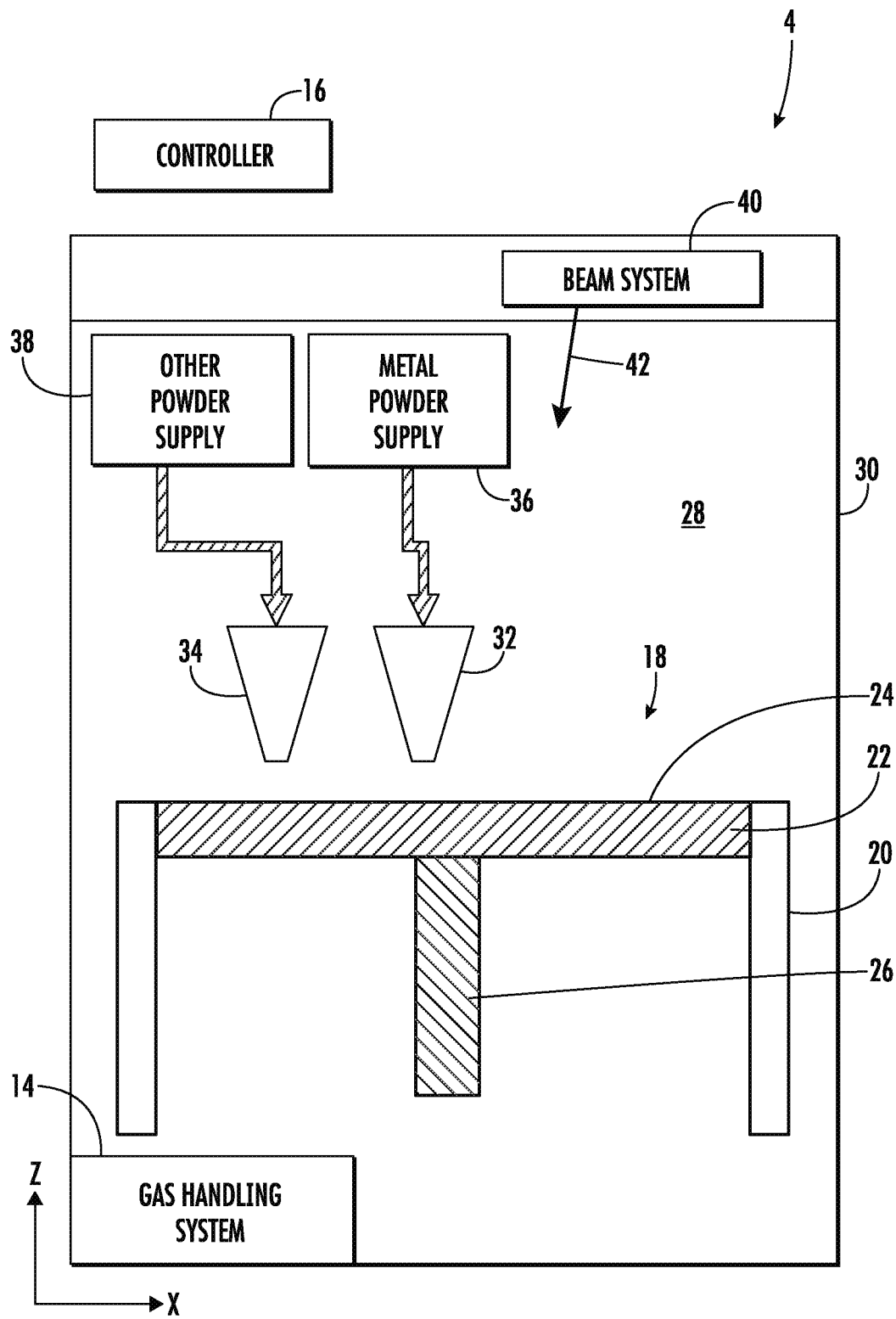
FIG. 2 is a schematic diagram of a 3D print engine. In the illustrated embodiment, the 3D print engine fabricates a 3D article through a layer by layer fusion melting of metal powder layers.

FIG. 2 is a schematic diagram of an embodiment of a 3D print engine 4. In describing FIG. 2 and for subsequent figures, mutually orthogonal axes X, Y and Z can be used. Axes X and Y are lateral axes that are generally horizontal. Axis Z is a vertical axis that is generally aligned with a gravitational reference. By "generally" it is intended to be so by design but may vary due to manufacturing or other tolerances.

The build box 18 includes a powder bin 20 containing a build plate 22. Build plate 22 has an upper surface 24 and is mechanically coupled to a vertical positioning system 26. The build box 18 is configured to contain dispensed metal powder (not shown). The build box 18 is contained within chamber 28 surrounded by housing 30.

A metal powder dispenser 32 is configured to dispense layers of metal powder upon the upper surface 24 of the build plate 22 or on previously dispensed layers of metal. In the illustrated embodiment, a second powder dispenser 34 is configured to dispense an additional powder such as another metal or a support material. Powder dispensers 32 and 34 are configured to receive powder from powder supplies 36 and 38 respectively.

Print engine 4 includes a beam system 40 configured to generate a beam 42 for selectively fusing layers of dispensed metal powder. In an illustrative embodiment, the beam system 40 includes a plurality of high power lasers for generating radiation beams individually having an optical power layer of at least 100 watts, at least 500 watts, or about 1000 watts or more. The beam system 40 can include optics for individually steering the radiation beams across a build plane that is coincident with an upper surface of a layer of metal powder. In alternative embodiments, the beam system 40 can generate electron beams, particle beams, or a hybrid mixture of different beam types.

The controller 16 can be configured to operate the print engine 4 to fabricate a 3D article: (1) operate the vertical positioning system 26 to position an upper surface 24 of build plate 26 or of a previously deposited layer of powder at one powder layer thickness below a build plane, (2) operate dispenser 32 to dispense a layer of metal powder on the upper surface 24, (3) operate the beam system to selectively fuse the just-dispensed layer of metal powder, and then repeat steps 1-3 to finish fabrication of the 3D article. The controller can also operate powder dispenser 34 and other components of print engine 4 as part of the fabrication.

Figure 3A:
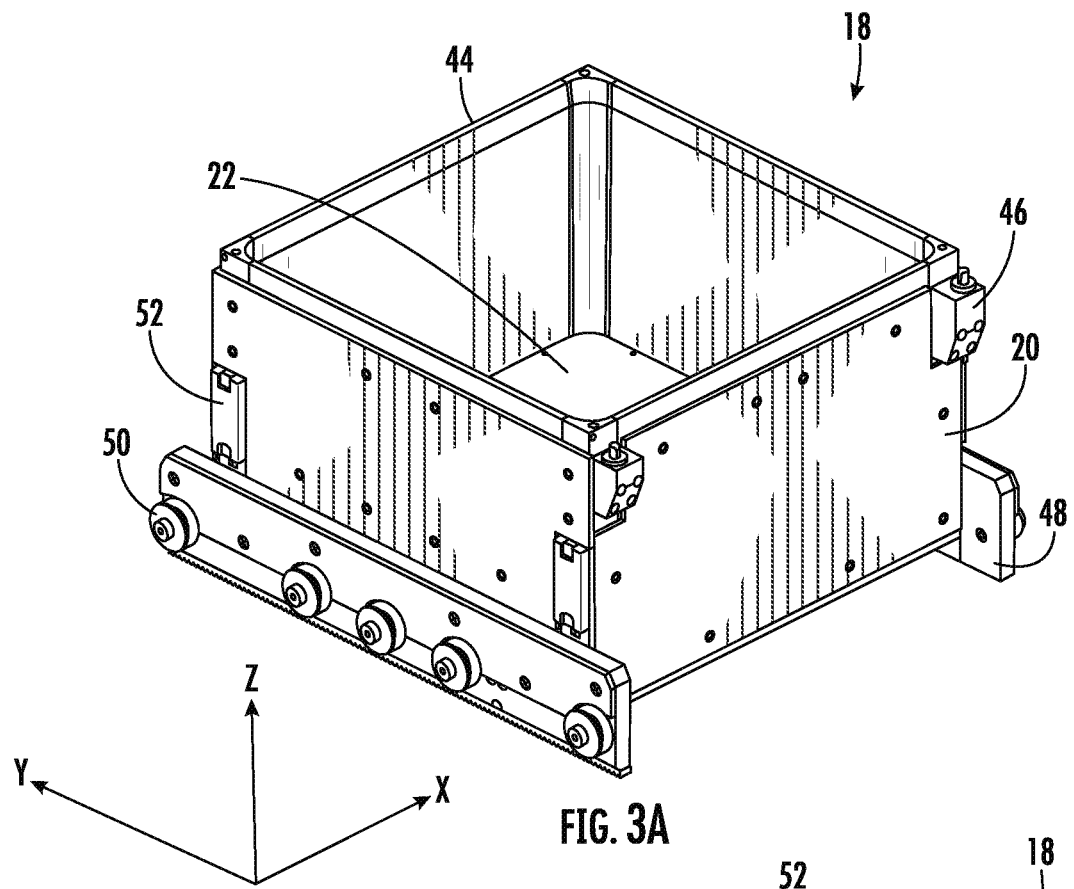
FIG. 3A is an isometric view looking generally downward on an embodiment of a build box. For this figure and subsequent figures, mutually orthogonal axes X, Y, and Z will be used. The X and Y axes are generally lateral or horizontal. The Z axis is generally vertical and aligned with a gravitational reference. By "generally," it is assumed that a direction is by design but may vary within manufacturing tolerances.
Figure 3B:
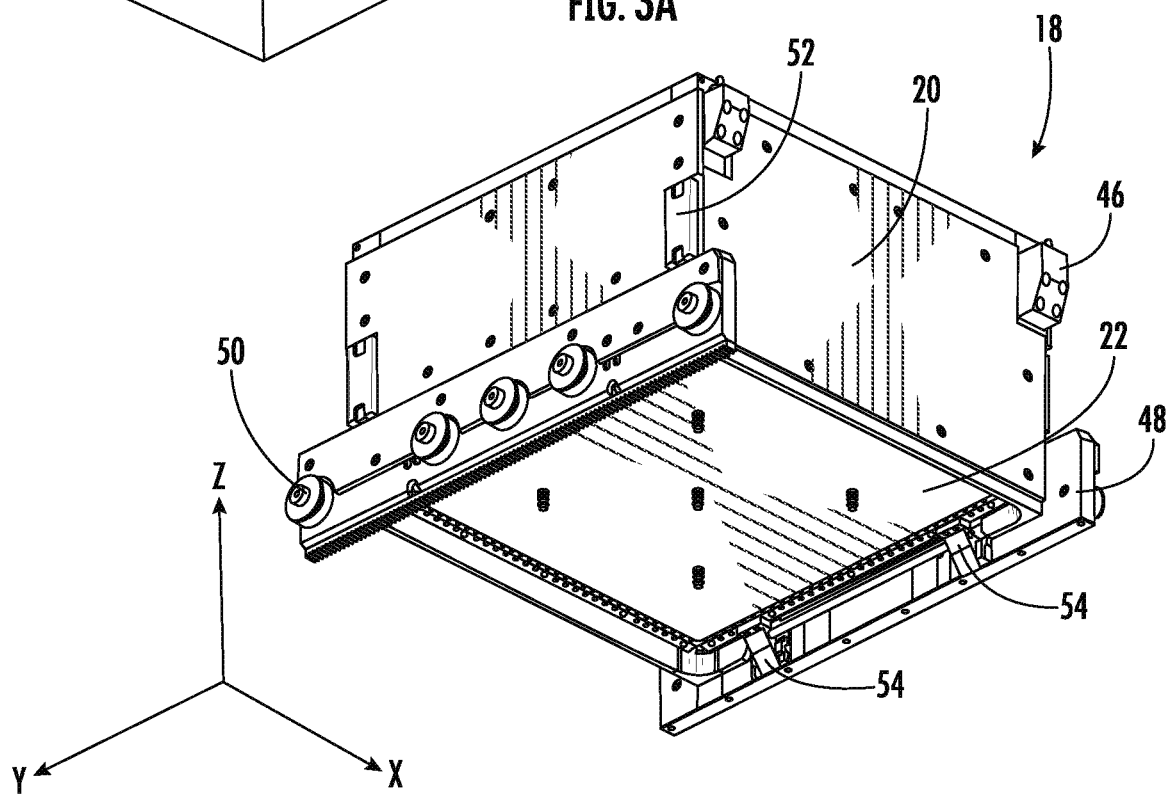
FIG. 3B is an isometric view looking generally upward on an embodiment of a build box.

FIGS. 3A and 3B are isometric views of an embodiment of a build box 18 which includes build plate 22 within powder bin 20. Powder bin 20 includes an open end 44 with upper clamp receivers 46 that extend from an end of powder bin 20 along the Y-axis. Powder bin 20 also has a pair of rails 48 with rollers 50 for transport within system 2. Rails 48 and rollers 50 extend along axis Y which is a direction of transport through the system 2. Y is a lateral transport direction and X is a transverse lateral direction. Four lateral clamp receivers 52 are at opposing ends (with respect to the Y-axis) of the powder bin 20 and face outwardly with respect to the X-axis.

Figure 4:
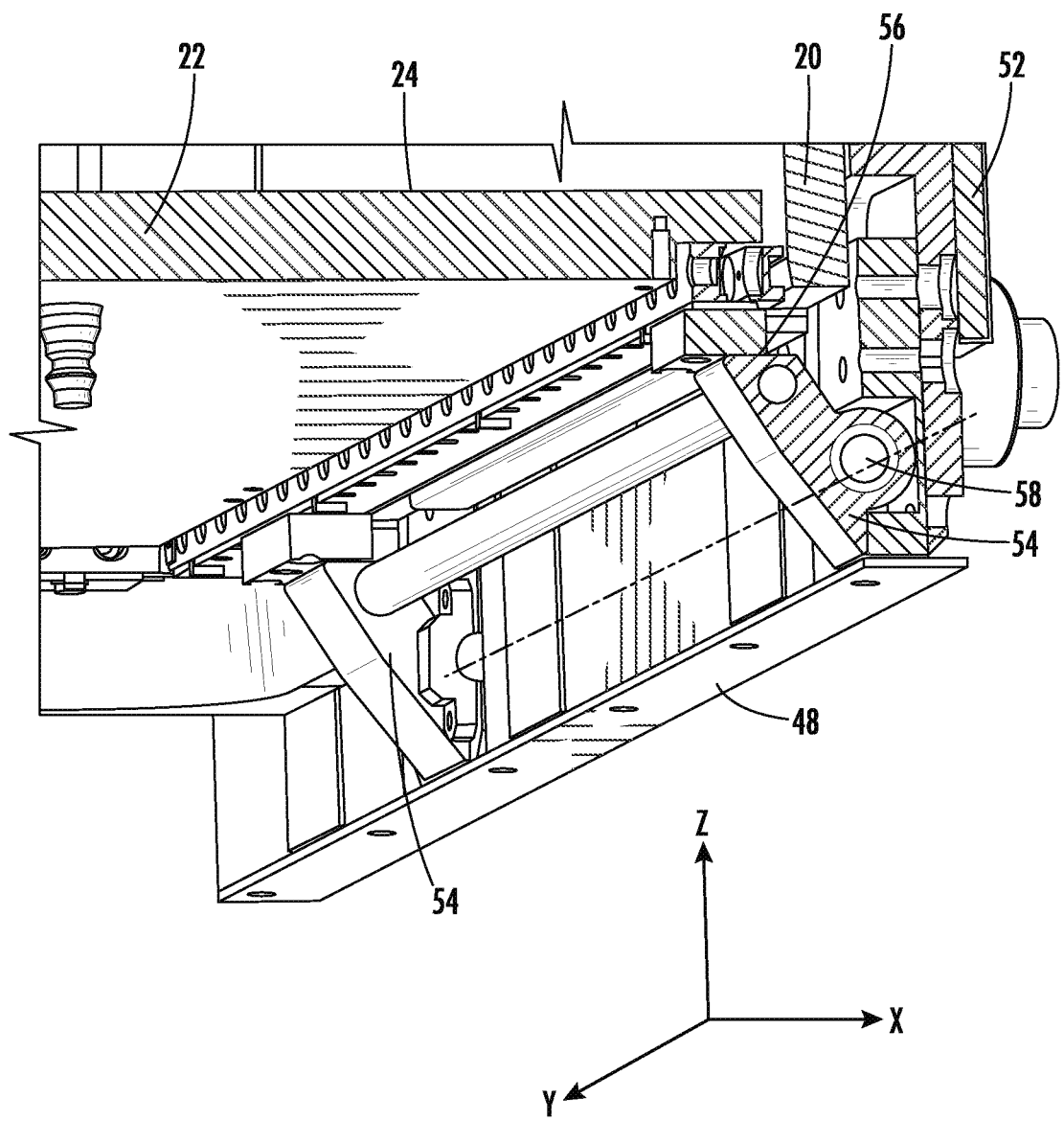
FIG. 4 is an isometric view of a portion of a build box which includes a powder bin and a build plate. Emphasis is on lower latches that secure the build plate within the powder bin.

FIG. 4 is an isometric view of a portion of the build box 18 to put emphasis on latches 54 for securing the build plate 22 to the powder bin 20. The powder bin 20 includes four lower latches 54 that secure and provide a lower limit for the build plate 22 during the fabrication and cooling processes. The lower latches 54 individually have an upper surface 56 for engaging the build plate 22. The lower latches 54 individually are rotatively mounted about a hinge 58 having an axis of rotation parallel to the Y axis.

Figure 5:
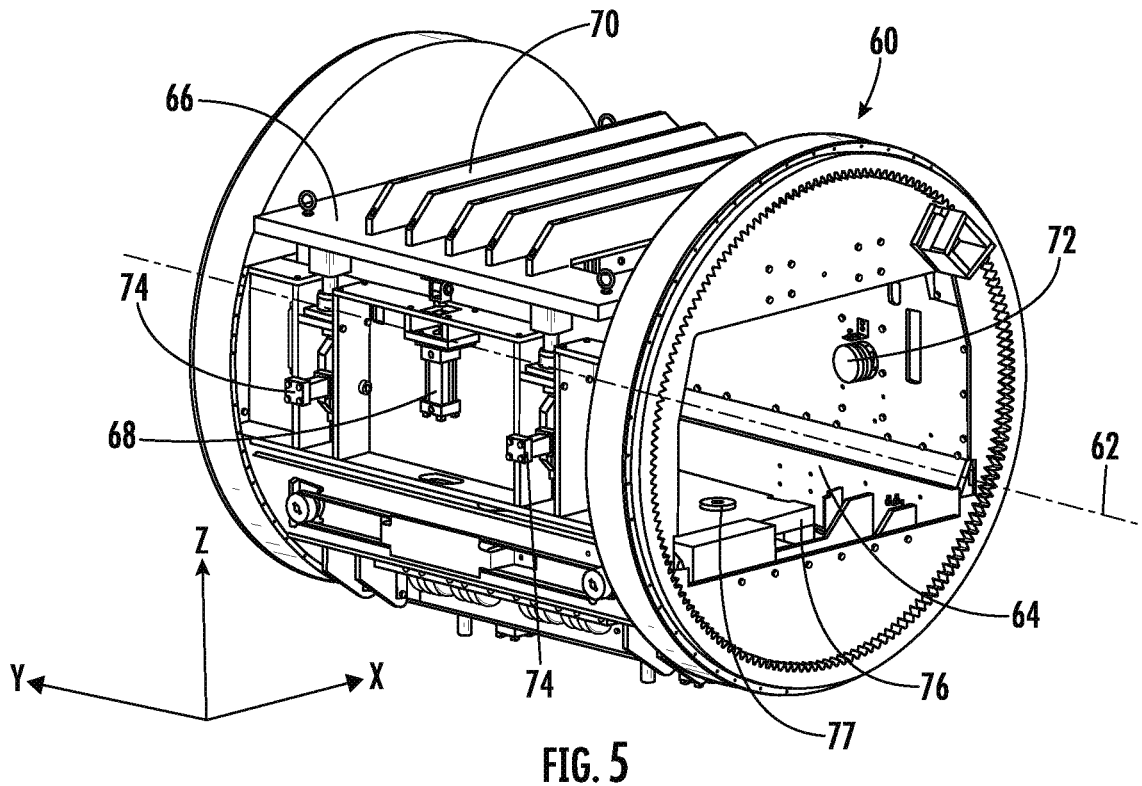
FIG. 5 is an isometric view of a rotary frame which is rotatively mounted within a bulk powder removal apparatus.

FIG. 5 is an isometric view of a rotary frame 60 which is rotatively mounted within the bulk powder removal apparatus 8. Rotary frame 60 is configured to be rotated about a central axis 62 for up to a complete 360 degree rotation. The central axis 62 is parallel to Y and is at an approximate center of a circular cross-section of the rotary frame 60. Rotary frame 60 defines an internal receptacle cavity 64 for receiving the build box 18. The build box 18 is received into the internal receptacle cavity 64 along the Y axis. The orientation of the rotary frame 60 illustrated in FIG. 5 is a rotative "home" position for rotary frame 60. A rotation angle such as 90 degrees or 180 degrees refers to a clockwise rotation about central axis 62 from the home position.

Rotary frame 60 includes an upper clamp 66 for engaging and clamping the open end 44 and upper clamp receivers 46 of the powder bin 20. Coupled between the upper clamp 66 and rotary frame 60 are actuators 68 for raising and lowering the upper clamp 66 along the vertical axis Z. Upper clamp 66 has an open top 70 to allow powder to exit at a rotation angles of about 180 degrees.

Figure 6:
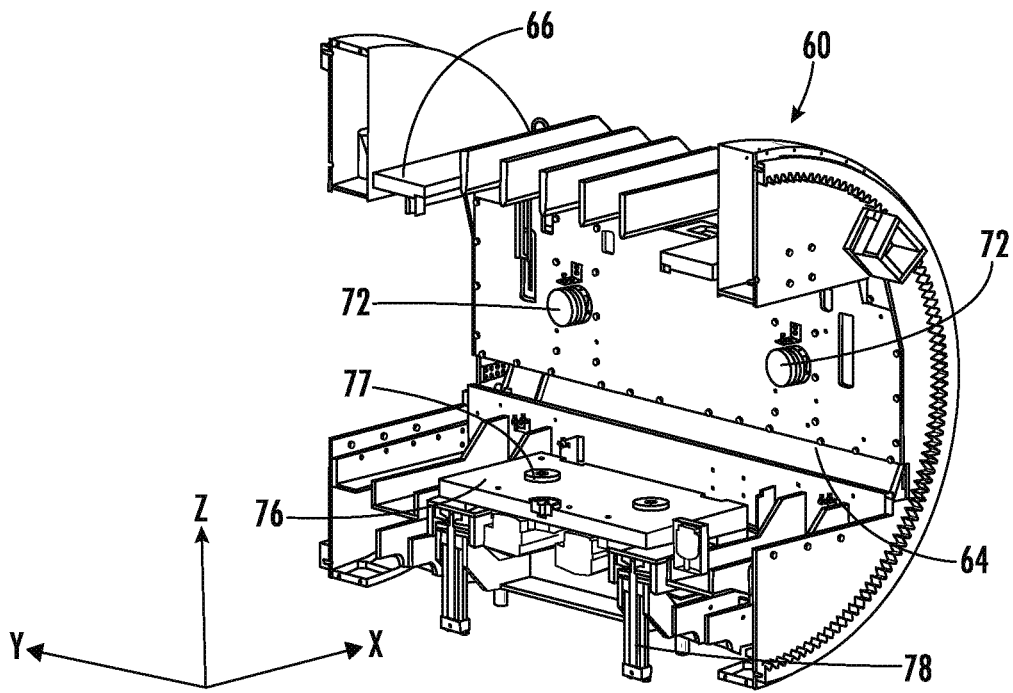
FIG. 6 is a cutaway isometric view of a rotary frame with a vertical cut that is parallel to a YZ-plane.

FIG. 6 is a cutaway isometric view of the rotary frame 60. The axes X, Y, and Z have the same orientation for FIGS. 5 and 6. Rotary frame 60 includes four lateral clamps 72 configured to extend and retract along the X-axis to engage and disengage the four lateral clamp receivers 52 of the powder bin 20. Coupled between the lateral clamps 72 and the rotary frame 60 are actuators 74 for extending and retracting the lateral clamp receivers 52 along the X-axis.

Rotary frame 60 includes a clamping plate 76 configured to engage, clamp, and displace the build plate 22. Coupled between the clamping plate 76 and the rotary frame 60 is a lift apparatus 78 (see FIG. 8B, 8I for more views) for moving the clamping plate 76 into engagement with the build plate 22 and for extracting the build plate 22 from the powder bin 20. The clamping plate 76 includes one or more pneumatic chucks 77 for gripping portion(s) of the build plate 22.

Figure 7:
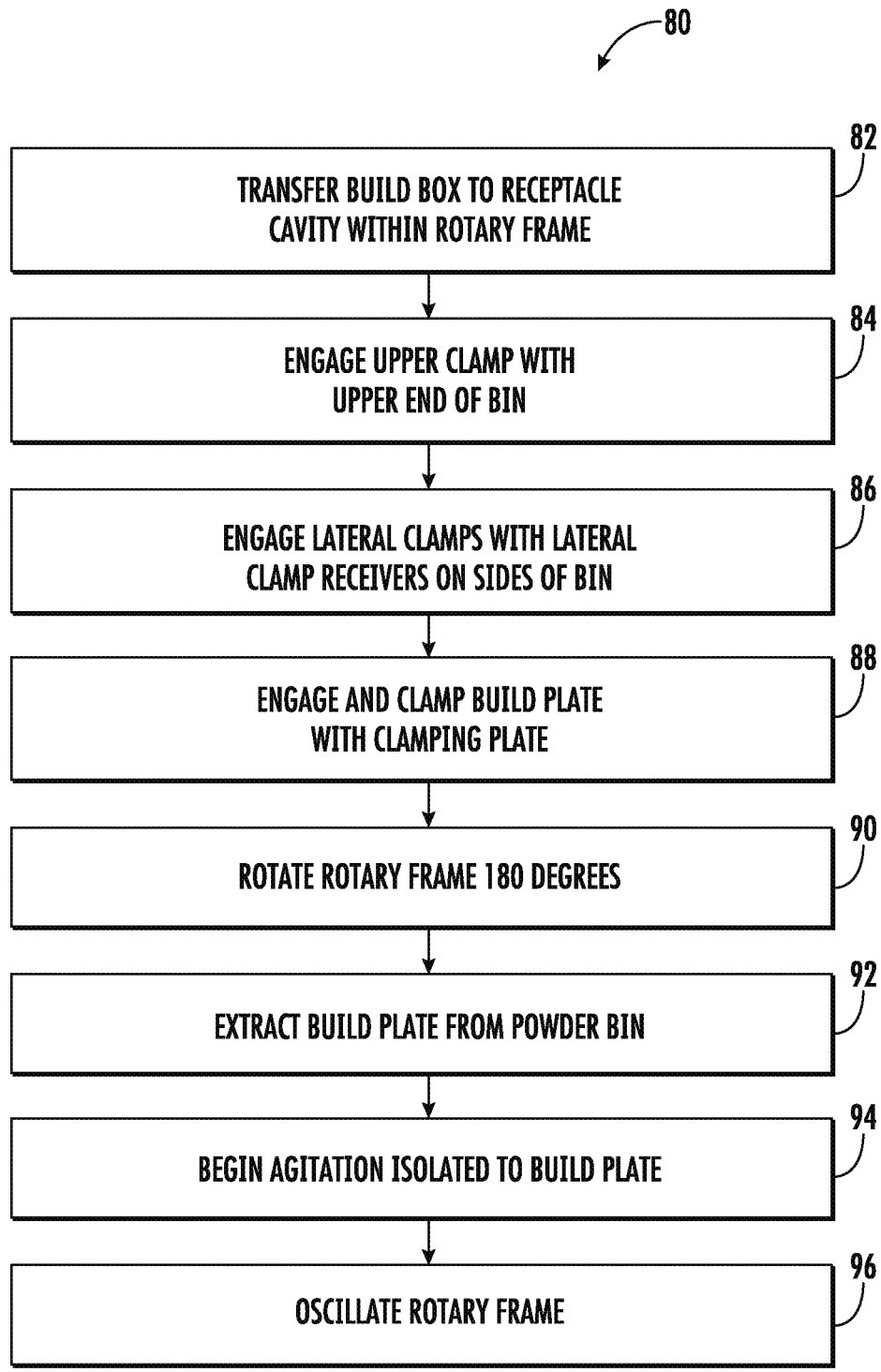
FIG. 7 is a flowchart of an embodiment of a method for removing bulk unfused powder from a build box.

FIG. 7 is a flowchart of an embodiment of a method 80 for removing bulk powder from the build box 18 using the bulk powder removal apparatus 8. Prior to method 80: (1) Print engine 4 fabricated a 3D article 100 onto the upper surface 24 of build plate 22; unfused powder surrounds the 3D article above the upper surface and within the powder bin 20. (2) The transport apparatus transported the build box 18 to the cooling station and time has elapsed for the contents of the build box 18 to cool.

According to 82, the transport apparatus 12 transfers the build box 18 to the internal receptacle cavity 64 of the rotary frame 60 (direction of motion indicated by block arrow 83 along Y-axis). FIG. 8A is a side cutaway YZ-view and FIG. 8B is a side cutaway XZ-view of the rotary frame 60 containing the build box 18 before any of the clamps (66, 72, 76) have engaged portions of the build box 18. Thus, clamps (66, 72, 76) are in their retracted state.

According to 84, the actuator(s) 68 are retracted to lower and engage the upper clamp 66 with the open end 44 and upper clamp receivers 46 of the powder bin 20. FIG. 8C is a side cutaway through the YZ-plane illustrating step 84 (direction of motion indicated by block arrows 85). The upper clamp 66 then applies a vertical clamping force upon the build box 18.

According to 86, the actuators 74 are expanded inwardly along the X-axis to engage the lateral clamps 72 with the lateral clamp receivers 52. FIG. 8D is an isometric cutaway view illustrating step 86. After steps 84 and 86, the build box 18 is clamped and restrained vertically and laterally.

According to 88, the lift apparatus 78 raises the clamping plate 76 which engages and clamps the build plate 22. FIG. 8E is a side cutaway view with a horizontal cut parallel to the X-plane illustrating step 88. The upward motion lifts the build plate 22 off of lower latches 54 and the build plate 22 is clamped with at least one pneumatic chuck 77 (FIG. 6) that is part of the clamping plate 76.

According to 90, the rotary frame 60 is rotated 180 degrees while the powder bin 20 and build plate 22 are separately clamped to the rotary frame 60. FIG. 8F is a side cutaway XZ-view illustrating step 90. Because the powder bin 20 is open at the end opposite to the build plate 22, a majority of the unfused powder will then fall vertically downward and into a capturing portion of the bulk powder removal apparatus 8 below the rotary frame 60. Also, in the inverted 180 degree position of the rotary frame 60, the latches 54 rotate inwardly so that the build plate 22 can be extracted in step 92.

According to 92, the lift apparatus raises the clamping plate 76 to extract the build plate 22 from the powder bin 20. This is an important step to provide vibration isolation of the build plate 22 from the powder bin 20. FIG. 8G is a side cutaway XZ-view illustrating step 92 with lift apparatus 78 lifting the clamping plate 76 and extracting the build plate 22.

FIG. 8H is a side schematic cutaway view illustrating isolated parts including the 3D article 100 with attached unfused powder coupled to the build plate 22 which is in turn coupled to the clamping plate 76. The 3D article 100 has been fabricated with a clearance 102 between inside surfaces 104 of the powder bin 20 and the 3D article 100.

Figure 8I:
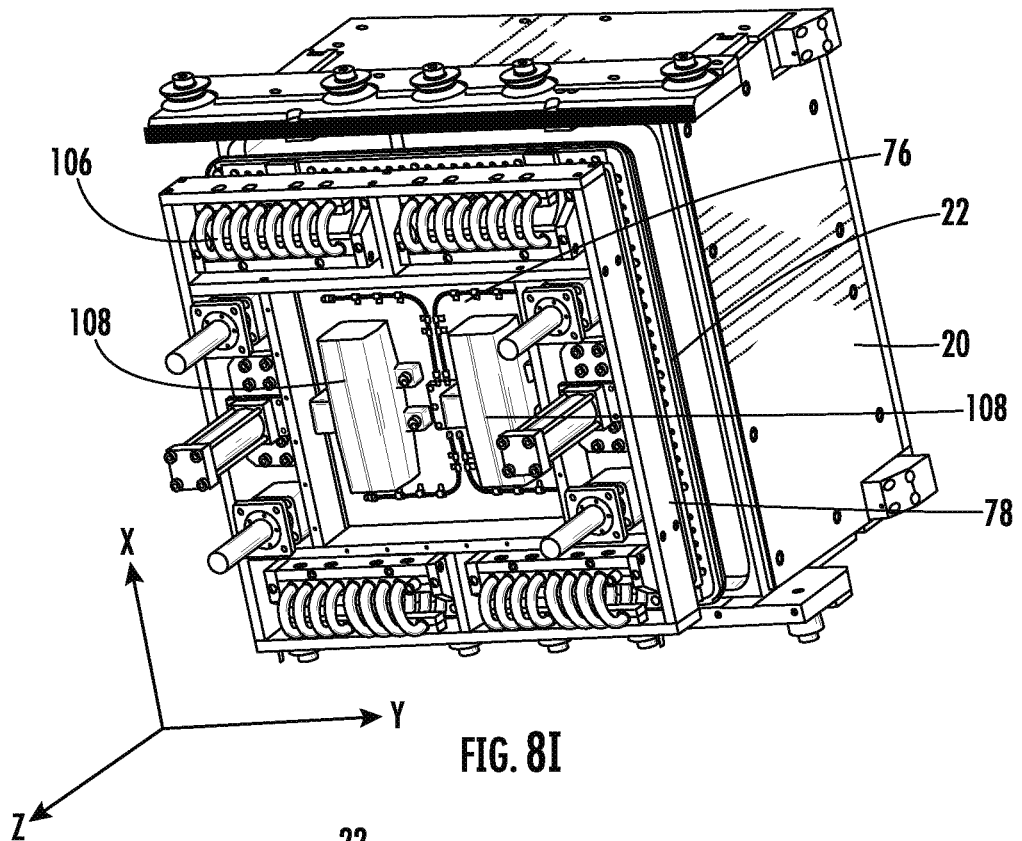
FIG. 8I is an isometric view of the powder bin, build plate, and build plate clamp. The build plate clamp is supporting the build plate in an extracted position relative to the powder bin. In the extracted position, the build plate is vibration isolated from the powder bin. In addition, features are shown at least partially vibration isolate the build plate from the rotary frame.

FIG. 8I is an isometric view of the powder bin 20, the build plate 22, and the clamping plate 76. FIGS. 8G, 8H, and 8I all correspond to step 92 in which the build plate 22 has been extracted from the powder bin 20 and therefore the build plate 22 is mechanically isolated from the powder bin 20. Wire rope isolators 106 also mechanically couple the clamping plate 76 to the rotary frame 60. Thus, the clamping plate 76 is vibration isolated from the powder bin 20 and from the rotary frame 60. The wire rope isolators 106 have a higher stiffness $K_C$ along the X-axis and a lower stiffness $K_a=0.5\ K_c$ along the Y-axis and a lower stiffness $K_b=0.5K_c$ along the Z-axis.

Two agitation devices 108 are mounted to the clamping plate 76. In the illustrated embodiment, the agitation devices 108 individually contain a motor coupled to an eccentric weight. The motor has an axis of rotation aligned with the X-axis. The primary vibratory force direction is along the vertical Z axis (perpendicular to the upper surface 24 of the build plate). A secondary vibratory force direction is along the Y-axis which is parallel to the upper surface 24.

According to 94, one or both of the agitation devices 108 are activated to facilitate and enhance removal of the unfused powder. Because the build plate clamp is vibration isolated from the powder bin 20 and the rotary frame 60, nearly all of the vibratory energy is transmitted and utilized for removing powder with minimal wasted energy that would otherwise vibrate the powder bin 20 and/or the rotary frame 60.

Figure 8J:
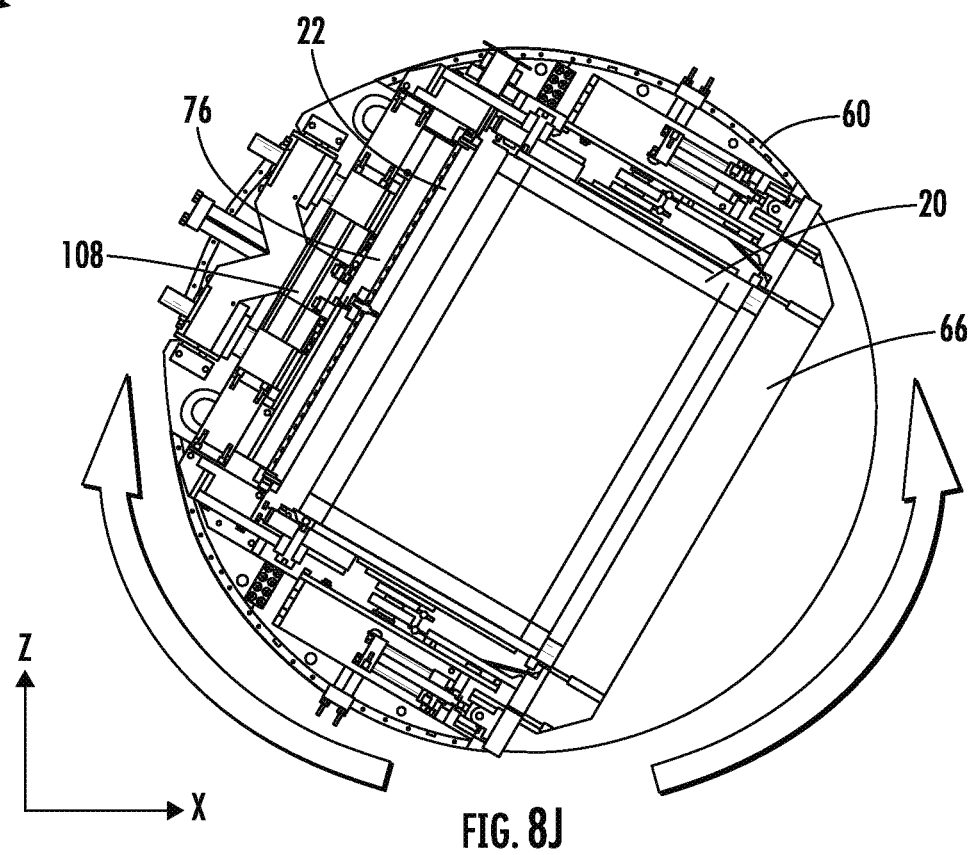
FIG. 8J is a side cutaway view of a rotary frame with a vertical cut parallel to a XZ-plane. Compared to FIG. 8G, the rotary frame is rotatively oscillating between 90 and 270 degrees relative to the rotative home position.

According to 96, concurrent with operating the agitation device(s) 108, the rotary frame rotates back and forth from the position of FIG. 8G. FIG. 8J illustrates this rocking rotational motion about central axis 62 (FIG. 5). This rocking motion further facilitates and enhances removal of the unfused powder. In an illustrative embodiment, the rocking motion would be about the Y axis for plus and minus 90 degrees from the position of FIG. 8G (or between 90 and 270 degrees from the position of FIG. 8B).

The specific embodiments and applications thereof described above are for illustrative purposes only and do not preclude modifications and variations encompassed by the scope of the following claims.

What is claimed:

1. A method of manufacturing a three-dimensional (3D) article comprising:
   transporting a build box into a print engine;
   operating the print engine to fabricate the 3D article within the build box in a layer-by-layer manner by the fusion and/or binding of powder material;
   transporting the build box with the 3D article to an internal receptacle of a rotary frame;
   actuating a plurality of clamps to secure the build box to the rotary frame;
   operate the rotary frame to rotate the rotary frame and the build box until unfused or unbound powder begins to exit the build box; and
   operate an agitation device to facilitate the pouring of the unfused or unbound powder from the build box.

2. The method of claim 1 wherein the method includes applying an energy beam to selectively fuse and melt layers of the powder material.

3. The method of claim 1 wherein transporting the build box includes transporting the build box over a pair of rails.

4. The method of claim 1 wherein the build box is transported to a cooling station after operating the print engine but before transporting the build box to the internal receptacle of the rotary frame.

5. The method of claim 1 wherein actuating the plurality of clamps includes lowering and engaging an upper and open end of the build box with an upper clamp, the upper clamp exerts a vertical clamping force upon the build box, the upper clamp has an open top to allow the unfused powder to exit through the upper clamp.

6. The method of claim 1 wherein actuating the plurality of clamps includes actuating a plurality of lateral clamps that exert a lateral force upon the build box.

7. The method of claim 1 wherein actuating the plurality of clamps includes actuating at least one upper clamp and at least one lateral clamp.

8. The method of claim 1 wherein the build box includes a powder bin and a build plate, actuating the plurality of clamps includes engaging the build plate with a clamping plate.

9. The method of claim 8 wherein the build plate is engaged with the clamping plate before operating the rotary frame to rotate the build box.

10. The method of claim 8 further comprising extracting the build plate from the powder bin after rotating the rotary frame but before operating the agitation device.

11. The method of claim 9 further comprising extracting the build plate from the powder bin after rotating the rotary frame but before operating the agitation device.

12. The method of claim 1, wherein rotating the rotary frame and the build box has a magnitude of rotation of about 180 degrees.

13. The method of claim 1, wherein the build plate is mechanically isolated from the build bin before operating the agitation device.

14. The method of claim 13 wherein operating the agitation device includes agitation with isolators coupled between the build plate and the rotary frame.

15. The method of claim 1 wherein operating the agitation device includes agitation primarily directed along an axis that is normal to a major axis of the build plate.

16. A method of manufacturing a three-dimensional (3D) article comprising:
- transporting a build box containing a powder material into a print engine, the build box including a lower build plate coupled to a powder bin;
- operating a print engine to fabricate a 3D article upon the build plate in a layer-by-layer manner through the selective consolidation of the powder;
- transporting the build box to an internal cavity of a rotary frame;
- actuating a plurality of clamps to secure the build box to the rotary frame;
- rotate the rotary frame to begin pouring unfused powder from the build box;
- isolating the build plate from the powder bin; and
- agitating the build plate to facilitate removal of the unfused powder.

17. The method of claim 16 wherein isolating the build plate from the powder bin includes clamping the build plate with a clamping plate and then moving the clamping plate upward to extract the build plate from the powder bin.

18. The method of claim 17 wherein the clamping plate includes an agitator, agitating the build plate includes operating the agitator.

19. A method of manufacturing a 3D article including:
- transporting a build box containing a powder material into a print engine, the build box including a lower build plate coupled to a powder bin;
- operating a print engine to fabricate a 3D article upon the build plate in a layer-by-layer manner through the selective consolidation of the powder but leaving a zone of unfused powder between the powder bin and the 3D article;
- transporting the build box to an internal cavity of a rotary frame;
- actuating a plurality of clamps to secure the build box to the rotary frame;
- clamping the build plate with a clamping plate, the clamping plate being coupled to the rotary frame with isolators, the clamping plate including an agitator;
- rotating the rotary frame and the build box to begin pouring unfused powder from the build box;
- raising the clamping plate to physically separate the build plate from the powder bin; and
- operating the agitator to facilitate removal of the unfused powder from the build plate, the isolators and the physical separation allowing agitation energy to be concentrated upon the build plate.

20. The method of claim 19 where the isolators are wire ropes, agitation motion is accommodated by the wire ropes when the agitator is operated.

* * * * *